United States Patent [19]

Miller

[11] Patent Number: 5,700,438
[45] Date of Patent: Dec. 23, 1997

[54] PROCESS FOR REMOVAL OF H2S FROM GAS PROCESSING STREAMS

[76] Inventor: John C. Miller, 32 Deer Point Dr., Hawthorn Woods, Ill. 60047

[21] Appl. No.: 695,156

[22] Filed: Aug. 5, 1996

[51] Int. Cl.$^6$ .................. B01D 53/48; B01D 53/52
[52] U.S. Cl. .................. 423/228; 423/229; 423/37; 423/242.7; 423/225
[58] Field of Search ............. 423/220, 226, 423/228, 229, 242.7, 243.01, 37, 225

[56] References Cited

U.S. PATENT DOCUMENTS

| | | | |
|---|---|---|---|
| 1,989,004 | 1/1935 | Fife et al. | 423/228 |
| 4,071,470 | 1/1978 | Davidson et al. | 423/229 |
| 4,143,119 | 3/1979 | Asperger et al. | 423/229 |
| 4,192,854 | 3/1980 | Harvey et al. | 423/220 |
| 4,370,306 | 1/1983 | Kirchner et al. | 423/220 |
| 4,435,371 | 3/1984 | Frech et al. | 423/242.7 |
| 5,147,620 | 9/1992 | Rozsa | 423/220 |
| 5,462,721 | 10/1995 | Pounds et al. | 423/226 |

FOREIGN PATENT DOCUMENTS

| | | | |
|---|---|---|---|
| 61-222922 | 10/1986 | Japan | 423/561.1 |
| 86-05474 | 9/1986 | WIPO | 423/229 |

OTHER PUBLICATIONS

Hydrocarbon Gas Processing, Chem. Eng. Sep. 1991 pp. 41–47.

Research Needs for Acid Gas Kinetics and Equilibria in Alkanolamine Systems, G. T. Rochelle; 70th An. Assoc. Convention, Mar. 1–12, 1991, San Antonio, TX.

*Primary Examiner*—Michael Lewis
*Assistant Examiner*—Peter DiMauro
*Attorney, Agent, or Firm*—John G. Premo

[57] ABSTRACT

A process for removing H2S and mercaptans from gas streams. The process comprises contacting such gas streams with an aqueous solution of copper complex of a water soluble amine to form water insoluble copper sulfide and regenerate free water soluble amine. The copper sulfide is removed from the system and recovered. Lastly, additional copper complex of the water soluble amine is formed by reacting the regenerated water soluble amine with a copper compound.

14 Claims, No Drawings

PROCESS FOR REMOVAL OF H2S FROM GAS PROCESSING STREAMS

FIELD OF THE INVENTION

This invention relates to the removal of H2S and mercaptans gas streams.

BACKGROUND OF THE INVENTION

In the article, Hydrocarbon Gas Processing, Chemical Engineering, September, 1991; pp 41–47, the author G. Samdani makes the following remarks which relate to problems associated with hydrogen sulfide and mercaptan contaminated gas processing streams:

"Hydrogen sulfide is the major nuisance facing gas processors. Present in refinery fuel and natural gas—along with modicums of carbonyl sulfide, carbon disulfide and thiols or mercaptans—$H_2S$ is highly toxic and corrodes pipelines. It is also a severe odor nuisance, even in minute concentrations, and is categorized as a hazardous air pollutant—with COS and $CS_2$—in Title III of amendments to the new U.S. Clean Air Act (CAA) (CE, December 1990, p. 24)."

"In the past, many sour natural-gas streams have been treated by removing the $H_2S$ by an amine process, which generates an offgas stream containing the $H_2S$ along with other acid gases, such as $CO_2$. Sulfur has usually been recovered from this tailgas only when marketable quantities are present. The sulfur recovery process most often used has been the Claus process (sidebar, p. 45). If the amine tailgas contains less than economically recoverable amounts of sulfur, the practice has typically been to vent or flare the stream. 'New environment pressures are making the venting or flaring of sulfur less and less acceptable."

This article as well as the paper, Research Needs for Acid Gas Kinetics and Equilibria in Alkanolamine Systems, G. T. Rochelle, 70th Annual Association Convention , Mar. 11–12, 1991, San Antonio, Tex. are incorporated herein by reference for purposes of illustrating the state of the art with respect to H2S and mercaptan removal.

Several of the presently used commercial processes for H2S removal are summarized below:

Summary of Current Technology for H2S Removal

Hot Potassium Carbonate System

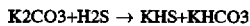

H2O

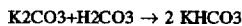

Amine Based Removal Systems

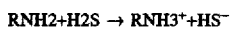

Solvent

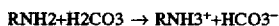

Amine Based Systems Include

Sulfinol—Uses sulfolane as the solvent and diisopropanolamine (DIPA) as the collector.
Rectisol—Uses cold methanol as the solvent and DIPA as the collector.
Selexol—Uses the dimethylether of polyethylene glycol as the solvent and DIPA as the collector.
Flexsorb PS—Uses sulfolane as the solvent and a proprietary hindered amine as the collector.
Flexsorb SE—Uses water as the solvent and a proprietary hindered amine as the collector.
DEA/MEA/H2O—Numerous systems have been developed that utilize water as the solvent and a mixture of
MEA and/or DEA as the collector(s).
Designer Amines—Various designer amines, similiar to Flexsorb SE, have been developed as collectors. These amines are sterically hindered and use water or a polar organic as the solvent.

Iron Spronge Removal System

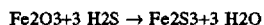

Claus Removal System

Catalyst

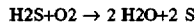

This process usually is used in conjunction with amine collectors, since the gas stream can not be treated directly in the presence of O2.

In many instances the streams treated contain amounts of CO2 in addition to the H2S and mercaptans. CO2 being acidic is also removed along with the H2S or mercaptans using current processes. This severely affects the effectiveness and efficiency of the prior art systems in removing H2S and mercaptans. Many of the prior art systems are incapable of reducing the amount of H2S removed to a level where it meets federal and local pollution laws.

OBJECTS OF THE INVENTION

It would be a valuable contribution to the technology of H2S and mercaptan removal if a process were available which could selectively remove H2S to a level below 0.1 ppm even though CO2 were present in high concentrations. Also of benefit would be a gas scrubbing process that could remove large amounts of H2S and mercaptans economically using catalytic amounts of a regenerable active carrier in combination with inexpensive readily available chemicals. Also advantageous would be a system that would operate efficiently under broad ranges of temperature and pressure. A further desirable feature of such a process would be that it could operate in either acidic or basic environments. These valuable and desirable properties and characteristics are afforded by practicing the invention hereafter described and, therefore, become the objects of this invention.

THE INVENTION

The present invention comprises a process for removing H2S and mercaptans from gas streams. It consists of the following sequential steps:

The first step comprises contacting such gas streams with an aqueous solution of copper complex of a water soluble amine. This contact should be done under conditions to allow for the formation of a water insoluble copper sulfide and the regeneration of free water soluble amine. In the next step, the copper sulfide and regenerated water soluble amine are separated and the copper sulfide recovered. Finally, as a last step, additional copper complex of the water soluble amine is formed by contacting the regenerated water soluble amine with a copper compound. In this step the copper compound desirably is present in a large molar excess. This contact of the regenerated free water soluble amine with the copper compound is repeated until the copper compound is exhausted.

In preferred embodiments of the invention the water soluble amine is a primary, sterically hindered alkanol amine. The alkanol amines desirably contain a terminal hydroxy alkyl group. A most preferred practice of the invention utilizes as the water soluble amine, 2-amino-2-hydroxymethyl-1,3-propanediol, sometimes hereafter referred to as "tris".

The source of copper used to prepare the amine complex may be selected from any cuprous or cupric compound, either water soluble or insoluble. Simple water insoluble copper compounds are preferred, particularly the copper oxides and most preferably cupric oxide. When water soluble salts are used, the selection should be governed by the operating pH of the process and the anion of the salt since certain anions may add undesirable characteristics to the process stream being treated.

The Water Soluble Amines

To be operative in the practice of the invention, the water soluble amines should have the ability to form stable copper complexes yet at the same time be incapable of forming complexes with copper sulfides. These amines benefically contain at least one amino group and more preferably hindered primary amines with one or more hydroxy alkyl groups. An amine meeting these criteria is 2-amino-2-hydroxymethyl-1,3-propanediol which is a relatively non-toxic material and is water soluble. Tris in its free amine form, or complexed with copper, produces a buffered pH ranging between 5–11 which represents a preferred pH range for practicing the process of the invention.

Examples of Water Soluble Amines

Amines

Methyl amine, ethyl amine, n-propylamine, n-butylamine, dimethylamine, diethylamine, di-n-propylamine, di-n-butylamine, trimethylamine, triethylamine, tri-n-proylamine, tri-n-butylamine, 2-methoxyethylamine, 2-methoxypropylamine, di-2-methoxyethylamine, ethylene diamine.

Hindered Amines

Tertiary butylamine.

Alkanol Amines

Monoethanol amine, monopropanol amine, monoisopropanol amine, diethanol amine, dipropanol amine, diisopropanol amine, triethanol amine, tripropanol amine, triiopropanol amine, methyldiethanol amine, dimethylmonoethanol amine, diethylmonoethanol amine, 2-amino-1-propanol, 2-amino-1-butanol, 2-2'-aminoethoxyethanol amine.

Hindered Alkanol Amines 2-amino-2-methyl-1,3-propanediol, 2-amino-2-ethyl-1,3-propanediol, 2-amino-2-hydroxymethyl-1, 3-propanediol.

The invention utilizes these amines in the form of aqueous solutions. An important feature of the invention is that the amount of amine in relation to the source of copper used to make the amine complex is such that there is present in such solutions between 0.05 to 5 moles of amine. In the case of 2-amino-2-hydroxymethyl-1,3-propanediol, amounts ranging between 0.1–4 moles will produce excellent H2S and mercaptan removal.

The Copper Compounds

When copper oxides, the preferred copper source for preparing the amine copper complexes are used, the preferred pH of the tris solutions is within the alkaline range, desirably between 9–11. Cupric oxide represents an excellent source of copper to prepare the amine copper complexes. Copper salts such as the sulfates, nitrates and chlorides may be used but are not preferred as a source of copper for the amine complexes. Finely divided copper may be used, e.g. copper metal or mixed copper-copper oxides having particle size preferably less than a few angstroms in size. Such elemental forms of copper are considered as being within the term, "copper compound".

Examples of Copper Salts

Cuprous Salts

Cuprous bromide, cuprous carbonate, cuprous chloride, cuprous fluoride, cuprous oxide, cuprous sulfate, cuprous thiocyanate.

Cupric Salts

Cupric acetate, cupric diammine dichloride, cupric hexaammine dichloride, cupric tetrammine sulfate, cupric bromide, cupric carbonate, cupric chloride, cupric citrate, cupric fluoride, cupric hydroxide, cupric nitrate, cupric oxide, cupric sulfate, cupric tartrate, cupric thiocyanate.

When water insoluble copper compounds are used in the practice of the invention they are employed as a aqueous slurry. They are present in such slurries in relatively large amounts in relation to the amine dissolved in the aqueous phase. Generally the copper compound is present in the slurry to provide at least one mole of copper metal. It is desirable that the number of moles of copper present in the slurry represent 1–300 or more moles of copper.

The Chemistry of the Removal System x tris

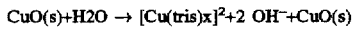

$CuO(s)+H2O \rightarrow [Cu(tris)x]^{+2}+2\ OH^-+CuO(s)$

A catalytic amount of 2-amino-2-hydroxymethyl-1, 3-propanediol (tris) is added to a large excess of cupric oxide in water to form a slurry. The tris complexes with the cupric oxide where x preferably is 1 to 4. This cupric-tris complex is soluble even at the basic pH of the system, which is approximately 10.0 to 10.5. Since the cupric oxide is insoluble under basic conditions, the pH of the system is determined totally by the concentration/buffering capacity of the tris.

Other cupric salts may be utilized resulting in the system being operated at a lower pH.

Absorption of H2S:

H2O

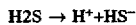

$H2S \rightarrow H^+ + HS^-$

H2O

$HS^- \rightarrow H^+ + S^{-2}$

H2O

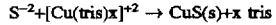

$S^{-2}+[Cu(tris)x]^{+2} \rightarrow CuS(s)+x\ tris$

The cupric-tris complex reacts with all available sulfide anion in solution. The tris that is liberated solubilizes more CuO thereby creating a catalytic system for sulfide removal.

CO2 Absorption

Tris does not absorb any CO2 because of a combination of steric hindrance and the strong affinity for the tris to complex with the divalent copper. Tris forms a very stable complex with copper. Since the tris is utilized in catalytic amounts, all of the tris is coordinated to the divalent copper until the CuO has been totally consumed to form insoluble CuS.

Low Level H2S Removal

The solubility product for CuS is $8.5 \times 10^{-45}$. If the concentration of tris that is used is 0.1 molar, and 4 molecules of this tris coordinate to 1 molecule of divalent copper, then the theoretical level of H2S that is left in solution is $3.4 \times 10^{-43}$ molar.

H2S and Mercaptan Removal is Independent of pH

Cupric sulfide is insoluble even under acidic conditions because of its very small solubility product. An illustration of this pH independence is given below.

Assume a pH of 2, a tris concentration of 0.1 molar which yields a divalent copper concentration of 0.025 molar, and a H2S concentration of 0.1 ppm. This yields, $$\frac{[H^+]^2 [S^{-2}]}{[H2S]} = \frac{[10^{-2}]^2 [S^{-2}]}{[2.9 \times 10^{-6}]} = 3.8 \times 10^{-23}$$

Solving for $[S^{-2}]$ gives $$[S^{-2}] = 1.1 \times 10^{-24} \text{ molar}$$

Substituting this value and the copper concentration, the solubility product gives:

$$[Cu^{+2}][S^{-2}] = [0.025][1.1 \times 10^{-24}] = 2.8 \times 10^{-26}$$

which is $>Ksp=8.5 \times 10.^{-45}$

Therefore, even at a pH of 2, the system will remove H2S to well below 0.1 ppm.

After all of the cupric oxide has been exhausted, the spent slurry is discharged to regeneration and the absorption unit is charged with a fresh CuO/tris/H2O mixture.

The tris is recovered by simple filtration of the slurry to isolate the aqueous tris from the solid CuS. The aqueous tris is adjusted to the proper molarity and added to a fresh charge of CuO. This slurry is then transferred back to the absorption unit.

The solid cupric sulfide that has been isolated from the tris can be oxidized to either elemental sulfur or sulfur dioxide:

$$2 \text{ CuS(s)} + \text{Air (O2)} \rightarrow 2 \text{ S(s)} + 2 \text{ CuO(s)}$$

$$2 \text{ CuS(s)} + \text{Air (3 O2)} \rightarrow 2 \text{ SO2(g)} + 2 \text{ CuO(s)}$$

Commercial Practice of the Invention

One of the advantages of the invention is that it is capable of utilizing conventional gas scrubbing equipment. Generally upflow scrubbing systems give the best results. The process thus described allows for a closed loop type operation wherein fresh or regenerated copper is added to the system. In many systems this can be done incrementally so that as copper used to make the tris complex is converted to insoluble copper sulfide which is removed from the system, fresh copper compound is added to maintain the amount of copper compound substantially constant. Similarly, a side stream of tris solution can be steadily or incrementally withdrawn, adjusted for molar concentration and be returned to the scrubber.

Time and Temperature Relationships

The temperature at which the process may be varied with increasing temperatures causing the conversion of tris to copper complex and its subsequent conversion to copper sulfide being more rapid. The reactions can be done at atmospheric or superatmospheric pressures. Vacuum environments may be used also. The reactions proceed readily at room temperature (Approximately 24 degrees C.) Elevated temperatures causing loss of water due to vaporization or loss of reactants should be avoided. Operating temperatures will in many instances be governed by the temperatures utilized in existing recovery systems. In nearly all cases the conversion of the tris and the other amines to their copper complexs occurs within a matter of a few minutes upon contact with the copper compound.

EXAMPLES

Example of A Typical Pilot Unit For H2S Removal

Conditions
H2S concentration—100 ppm H2S
Flow rate—100,000 scf/day
Temperature—25 degrees Centigrade
Pressure—atmospheric
Size of absorption unit—10'×10" I.D.

Capacity
Volume of Absorption Unit $$V = (pi)(r)^2(l)$$

$$V = (3.14)(5")^2 (10') \frac{(12")}{(1')} = 9420 \text{ cu. in.}$$

Loading
CuO=10% by volume=942.0 cu. in.

$$W = (942.0 \text{ cu. in.}) \frac{(16.4 \text{ cc})}{(1 \text{ cu. in.})} \frac{(6.32 \text{ g})}{(1 \text{ cc})} \frac{(1 \text{ kg})}{(1000 \text{ g})}$$

CuO=97.6 kilograms

Loading
H2O=65% by volume=6123 cu. in.

$$W = (6123 \text{ cu. in.}) \frac{(16.4 \text{ cc})}{(1 \text{ cu. in.})} \frac{(1.0 \text{ g})}{(1 \text{ cc})} \frac{(1 \text{ kg})}{(1000 \text{ g})}$$

H2O=100 kilograms=100 liters
Tris=1.0 molar $$W = \frac{(121 \text{ g})}{(\text{mole})} \frac{(1.0 \text{ moles})}{(1 \text{ liter})} \frac{(1 \text{ kg})}{(1000 \text{ g})} (100 \text{ liters})$$

W=12.1 kilograms
H2S Absorbed Under Test Conditions
Overall Reaction

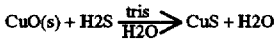

$$\text{Moles CuO} = \text{Moles H2S} = \frac{(97.6 \text{ kg})}{(79.55 \text{ g/mole})} \frac{(1000 \text{ g})}{(1 \text{ kg})}$$

Moles H2S=1227 moles
Lifetime of Absorption Solution Under Test Conditions $$\text{Time} = \frac{(\text{moles H2S}) (\text{gas constant}) (\text{temperature})}{(\text{fraction H2S}) (\text{pressure}) (\text{gas flow rate})}$$

-continued $$\text{Time} = \frac{(1227 \text{ moles}) \frac{(0.082 \text{ atm-1}) (298 \text{ K}) (1 \text{ scf})}{(\text{K-mole}) (28.3 \text{ l})}}{(100/1,000,000) (1 \text{ atm}) (100,000 \text{ scf/day})}$$

Time=106 days

Applications

The invention may be used to replace or modify existing amine-based H2S collector systems. It can be used in a variety of refinery sweetening operations. It also can be set up to treat small remote gas and oil wells. It is suitable for treating H2S generating processes.

I claim:

1. A process of removing $H_2S$ and mercaptans from gas streams that may contain $CO_2$ to an $H_2S$ level below 0.1 ppm which comprises the steps:
   a) contacting gas streams which contain $H_2S$ and mercaptans with an aqueous solution of copper complex era sterically hindered, water soluble, primary amine which solution contains a molar excess of copper relative to content of sterically hindered, water soluble primary amine: to form water insoluble copper sulfide and regenerated free sterically hindered, water soluble, primary amine;
   b) separating and recovering the copper sulfide; and then,
   c) forming additional copper complex by reacting the regenerated sterically hindered, water soluble, primary amine with a copper compound.

2. The process of claim 1 where the copper compound is a copper oxide.

3. The process of claim 2 where the copper oxide is cupric oxide and steps a) through c) are repeated until substantially all the copper compound is exhausted.

4. The process of claim 2 where the sterically hindered water soluble, primary amine is an alkanol amine.

5. The process of claim 4 where the alkanol amine contains a terminal hydroxy alkyl group.

6. The process of claim 5 where the alkanol amine is 2-amino-2-hydroxymethyl-1,3-propanediol.

7. The process of claim 1 where the pH of the aqueous solution of the sterically hindered water soluble primary amine is within the range of between 5–11.

8. A process for removing $H_2S$ and mercaptans from gas streams that may contain $CO_2$ to an $H_2S$ level below 0.1 ppm which comprises the steps:
   a) contacting gas streams which contain $H_2S$ and mercaptans with an aqueous solution era copper complex era sterically hindered, water soluble, primary amine which solution contains slurried therein a molar excess of copper oxide relative to content of sterically hindered, water soluble primary amine to form insoluble copper sulfide and to regenerate free sterically hindered, water soluble, primary amine;
   b) separating and recovering the copper sulfide; and then,
   c) forming more copper complex of the regenerated sterically hindered, water soluble, primary amine by reacting it with copper oxide.

9. The process of claim 8 where the sterically hindered, water soluble primary amine is an alkanol amine.

10. The process of claim 9 where the water soluble, sterically hindered, alkanol amine contains a terminal hydroxy alkyl group.

11. The process of claim 10 where the alkanol amine is 2-amino-2-hydroxymethyl-1,3-propanediol.

12. The process of claim 8 where the copper oxide is cupric oxide.

13. The process of claim 8 where steps a) through c) are repeated until substantially all the copper oxide is exhausted.

14. The process of claim 8 where the pH of the aqueous solution of the sterically hindered water soluble primary amine is within the range of between 5–11.

* * * * *

UNITED STATES PATENT AND TRADEMARK OFFICE
CERTIFICATE OF CORRECTION

PATENT NO. : 5,700,438
DATED      : December 23, 1997
INVENTOR(S) : John C. Miller It is certified that error appears in the above-identified patent and that said Letters Patent is hereby corrected as shown below:

Claim 1, line 6; Claim 8, lines 5 and 6:  Change "era" to read "of a".

Signed and Sealed this

Twenty-fourth Day of March, 1998

Attest:

BRUCE LEHMAN

*Attesting Officer*       *Commissioner of Patents and Trademarks*